(12) United States Patent
Frentzel-Beyme et al.

(10) Patent No.: US 8,271,347 B2
(45) Date of Patent: Sep. 18, 2012

(54) DATA DISTRIBUTION METHODS

(75) Inventors: Samuel Frentzel-Beyme, Baltimore, MD (US); Keiji Matsumoto, Kanagawa (JP)

(73) Assignee: Resource Consortium Limited (VG)

( * ) Notice: Subject to any disclaimer, the term of this patent is extended or adjusted under 35 U.S.C. 154(b) by 0 days.

(21) Appl. No.: 13/311,322

(22) Filed: Dec. 5, 2011

(65) Prior Publication Data

US 2012/0110102 A1  May 3, 2012

Related U.S. Application Data

(63) Continuation of application No. 12/539,968, filed on Aug. 12, 2009, now Pat. No. 8,073,743, which is a continuation of application No. 10/937,858, filed on Sep. 10, 2004, now Pat. No. 7,577,586.

(51) Int. Cl.
*G06Q 30/00* (2006.01)
(52) U.S. Cl. .................................... 705/26.1
(58) Field of Classification Search ............... 705/26.1
See application file for complete search history.

(56) References Cited

U.S. PATENT DOCUMENTS

| | | | |
|---|---|---|---|
| 6,389,457 B2 | 5/2002 | Lazaridis | |
| 6,424,828 B1 | 7/2002 | Collins | |
| 6,490,432 B1 | 12/2002 | Wegener et al. | |
| 6,633,867 B1 * | 10/2003 | Kraft et al. | 705/26.1 |
| 7,305,355 B2 * | 12/2007 | Tarvydas et al. | 705/26.43 |
| 7,356,557 B2 * | 4/2008 | Kikuchi et al. | 709/201 |
| 2002/0087627 A1 | 7/2002 | Rouse | |
| 2002/0087628 A1 | 7/2002 | Rouse | |
| 2003/0021441 A1 | 1/2003 | Levy | |
| 2003/0055906 A1 | 3/2003 | Packham | |
| 2003/0104827 A1 | 6/2003 | Moran | |
| 2003/0220979 A1 | 11/2003 | Hejl | |
| 2004/0186768 A1 | 9/2004 | Wakim et al. | |
| 2005/0203914 A1 | 9/2005 | Bryant et al. | |

OTHER PUBLICATIONS

Handmark Pocket Express; PR Newswire. New York: Aug. 11, 2004. p. 1; http://proquest.umi.com/pqdweb?did=677090161&sid=2&Fmt=3&clientId=19649&RQT=309&VName=PQD.*
Handmark Pocket Express, Missouri, Greece, PR Newswire, New York, Aug. 11, 2004, p. 1; http://proquest.umi.com/pqdweb?did=677090161&sid=3&Fmt=3&clientId=19649&RQT=309&Vname=PQD.
Best Buy planning radio IDs on goods; Star Tribune. Minneapolis, Minn.: Sep. 1, 2004. p. 1.D http://proquest.umi.com/pqdweb?did=687530701&sid=2&Fmt=3&clientId=19649&RQT=309&VNAme=PQD.

* cited by examiner

*Primary Examiner* — Mila Airapetian
(74) *Attorney, Agent, or Firm* — Carlineo, Spicer & Kee, LLC

(57) ABSTRACT

A self-distribution method and system for distributing information content among network connected devices includes receiving a query having a code against a database from a wireless communications device, the code uniquely representing one of an advertising campaign, a product, or a service. A result set is generated by querying the database, forwarding a link associated with the result set to a user-preferred remote location, the link being sent in an electronic message. The link directs a user to a first version of information content. A plurality of options to purchase user-preferred items from the first version of information content include "purchase now" and "purchase later" features. A reminder message is forwarded to the wireless communications device if a user at the remote location selects the "purchase later" feature. The user is enabled to conduct a purchase transaction from the remote location or the wireless communications device.

20 Claims, 7 Drawing Sheets

DATA DISTRIBUTION METHODS

CROSS REFERENCE TO RELATED APPLICATION

This application is a continuation of U.S. patent application Ser. No. 12/539,968, filed Aug. 12, 2009 now U.S. Pat. No. 8,073,743, entitled Self Distribution Methods, Coded Self-Distribution Methods, and System for Distributing Information, which is a continuation of U.S. patent application Ser. No. 10/937,858 (now U.S. Pat. No. 7,577,586), filed Sep. 10, 2004, entitled Self Distribution Methods, Coded Self-Distribution Methods, and System for Distributing Information, the entire disclosures of which are incorporated herein by reference.

TECHNICAL FIELD

Aspects of the invention generally relate to self-distribution methods, coded self-distributing methods, and systems for distributing information.

BACKGROUND OF THE INVENTION

Transmission of data via communication devices, such as, for example, cellular phones, and communication networks such as Internet are generally known.

In recent days, users are constantly bombarded with marketing and advertising related information and the increased proliferation of direct marketing and spam have lead to increased discontent and distrust by consumers as to the benefit of marketing communications Recent studies show that many consumers would prefer to stop or block receiving such marketing and advertising related information and feel that such information has very little relevance for them. Part of the reason for such consumer attitude can be that dialogue between organizations and consumers has been primarily in one direction (e.g., from organizations to consumers). Consumers lack tools to better control and interact with marketing and advertisement messages presented to them. Also, the consumers are not presented with options to inquire, in real-time, about the information content they are interested in.

Moreover, organizations are also under increased pressure to clarify how marketing and advertising contribute to their profits to increase the bottom line. Tools that allow organizations to better monitor the impact of the marketing and advertising communications would be increasingly necessary.

Thus, a new tool that allows consumers to perform better management and control of the marketing and information laden environments that surround them while simultaneously providing the organizations an improved ability to monitor the effectiveness of their communications programs can lead to more effective communications with the consumers. Such tools can also improve the efficiency of the organizations and provide a better ability to quickly match the demands of the users with the industry supply.

Attempts to solve the above-noted problems have not been effective. Using presently available systems, it can be difficult for users to conveniently inquire about information regarding the content of a distributed media at a point of original contact (e.g., using a portable communications device in real-time). U.S. Pat. No. 6,490,432 to Wegener et al., U.S. Pat. No. 6,389,457 to Lazaridis et al. generally disclose various ways of forwarding information to users, the entire contents of such patents are incorporated by reference in this patent. Current use of communication devices can be restrictive due to the presence of long alphabetical strings representing data that is distributed over the communication networks. Furthermore, reading comprehensive text on small display screens, such as those on portable communication devices (e.g., cellular phones, PDAs, etc.) can be difficult.

Additionally, people under time constraints may not be well situated to read the information at an exact time when they desire the information. Further, the rich-media capability and interactivity typically available on personal computers is limited on portable communication devices, thereby limiting user experience. Also, there appears to be no system that allows consumers to personally store, manage, and manipulate their points of original contact with various forms of information in a user customized format that is accessible from any network-connected device.

Accordingly, systems and methods are needed to enable users to quickly inquire about information regarding the content of distributed media at the point of original contact while overcoming at least the above-noted problems. Systems and methods are also needed for organizations to directly and easily determine the effectiveness of their communication campaigns in real-time.

SUMMARY OF THE INVENTION

Aspects of the invention relate to self-distribution methods and systems for distributing information. Aspects of the invention also relate to systems for self-distributing information content among network-connected devices.

Aspects of the invention enable users to be able to quickly choose relevant information on content of distributed media at a point of reference and have that information sent to a receiving location (e.g., home e-mail address) where the user-experience is not limited by screen space, functionality and other environmental factors. Aspects of the invention enable organizations using the system of the present invention to assess the quality of their communication programs (e.g., advertisement campaigns) by determining which groups of users are responding to the content by inquiring about additional information of the communication programs.

In some embodiments, a coded self-distribution method for distributing information includes receiving a query against a database from a wireless communications device, generating a query result set, forwarding a link associated with the query result set to a user preferred remote location, the link directing a user to a first version of information content of the query result set, generating a second version of information content of the query result set, and forwarding the second version to the wireless communication device.

In other embodiments, a self-distribution method for distributing information content among network connected devices of a communications network includes receiving a query having a numeric code or an alphanumeric code against a database from a wireless communications device, the numeric code or the alphanumeric code uniquely representing one of an advertising campaign, a product, or a service, generating a result set by querying the database with the numeric code or the alphanumeric code, forwarding a link associated with the result set to a user-preferred remote location, the link being sent in an electronic message, wherein activation of the link directs a user to a first version of information content of the result set. The method also includes providing a plurality of options to purchase user-preferred items from the first version of information content, the options including at least "purchase now" and "purchase later" features, forwarding a reminder message to the wireless communications device if a user at the remote location selects the "purchase later" feature, and enabling the user to conduct a purchase transaction from at least the remote location or the wireless communications device.

In yet other embodiments, a system for self-distributing information content among network connected devices of a communications network includes a web-enabled server configured to register a user of a wireless communications device and receive a query having a numeric code or an alphanumeric code from the user of the wireless communications device, a database having information content stored therein, a central server configured to interact with the web-enabled server and the database, the central sever configured to query the database in order to generate a result set having dynamically generated web pages, and the web-enabled server being configured to receive the result set and forward a hyperlink associated with the result set to a user-preferred remote location, the link being sent in an electronic message and activation of the link directs a remote user at the remote location to information content of the result set, the web-enabled server being further configured to provide the remote user with at least "purchase now and "purchase later" options, the web-enabled server being further configured to forward a reminder message to the wireless communications device if a user at the remote location selects the "purchase latex" option.

In further other embodiments, a system for self-distributing information content among network connected devices includes a wireless communications device having an internet interface, the wireless communications device configured to receive a numeric code or an alphanumeric code, a server configured to interface with the wireless communications device, a database configured to receive the numeric code or the alphanumeric code from the wireless communications device via the server, the server configured to produce a result set. The server is configured to forward a hyperlink associated with the result set to a remote location, the link directing a user to a first version of information content of the result set. The server is further configured to generate a second version of information content of the result set, the second version being forwarded to the wireless communications device for immediate use by a user of the wireless communications device.

In an additional embodiment, a system for self-distributing information content among network connected devices of a communications network includes a web-enabled server configured to register a user of a wireless communications device and receive a query having a code, associated with the information content, from the user of the wireless communications device. The system also includes a database having information content stored therein, a central server configured to interact with the web-enabled server and the database. The central sever is configured to query the database in order to generate a result set having dynamically generated web pages. The web-enabled server is configured to receive the result set and forward a hyperlink associated with the result set to a user-preferred remote location, the link being sent in an electronic message and activation of the link directs a remote user at the remote location to information content of the result set. The web-enabled server is also configured to provide the remote user with at least "purchase now" and "purchase later" options, the web-enabled server being further configured to forward a reminder message to the wireless communications device if a user at the remote location selects the "purchase later" option.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
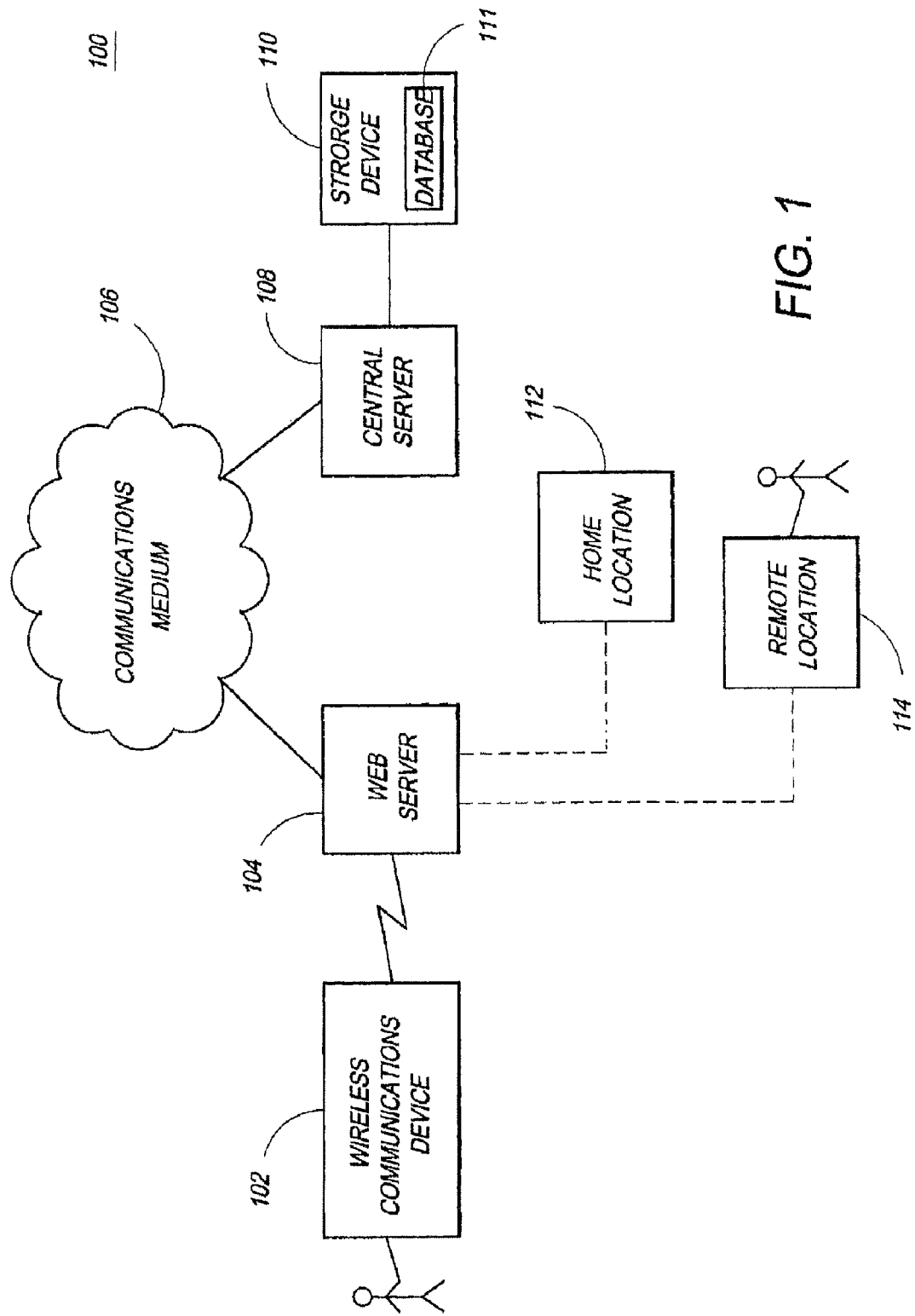
FIG. 1 is a high-level schematic of a system for self-distributing information in accordance with various embodiments of the invention.

FIG. 1 is a high-level schematic of a system 100 for self-distributing information in accordance with various aspects of the invention. More particularly, the system 100 includes a wireless communications device 102 (e.g., cellular telephone, PDA with communications capabilities, etc.), a web server 104 (e.g., web-enabled server), communications medium 106 (e.g., packet switched network, internet), a central server 108, a storage device 110, and destination devices at locations 112 and 114.

The wireless communications device 102 can be a cellular telephone or other portable device having communications capabilities that can be carried by a user. In accordance with various embodiments, the communications device 102 is configured for both voice and data communications with other communication devices (e.g., wireless, wired). For data communications, the communications device 102 can be configured to interface with the web-enabled server 104 which is communicatively connected to the communications medium 106 (e.g., internet).

The web server 104 (e.g., web-enabled server) is communicatively coupled to the communications device 102 and the communications medium 106 in order to provide a communications link therebetween.

The communications medium 106 is configured to communicate information between various communications devices. In exemplary embodiments, the communications medium 106 can be the internet. Other data communication networks are possible.

The central server 108 is configured to process various user-generated requests. The central server 108 is communicatively connected to the communications medium 106 and is configured to receive user-generated requests from the web server 104. Information processed by the central server 108 is provided to the web server 104 which in turn is configured to forward the processed information to user-desired destination locations 112, 114, respectively (e.g., home location, remote location, respectively). Further details of the central server 108 are described below with respect to FIG. 3.

The storage device 110 is configured to store data received from various sources (e.g., vendors, device 102). Information stored in the storage device 110 can be used by the central server 108 for processing requests generated by users (e.g., user of device 102). The storage device 110 can comprise a database 111 that can be used to organize information stored in the storage device 110. For example, the central server 108 can be used to search the storage device 110 or the database 111 to retrieve information requested by a user (e.g., user carrying the device 102). Such retrieved information can be processed by the central server 108 and forwarded to a user desired location (e.g., location 112, location 114) via the communications medium 106 and the web server 104.

Location 112 can comprise a home location of a user (e.g., home location of user carrying the device 102). Such location 112 can comprise a computer system that is communicatively connected to the communications medium 106 and the web server 104. A user of the device 102 can request to obtain desired information (e.g., information content of distributed media) from the storage device 110. Information retrieved from the storage device 110 can be processed by the central server 108 and forwarded to location 112 to be used by the user at a later time as per the user's convenience. Information sent to the home location (e.g., location 112) can be a detailed first version of the information retrieved from the storage device 110. A second version (e.g., reduced information content) of information retrieved from the storage device 110 can be forwarded to location 114 (e.g., wireless device) for immediate use by a user at the location 114. In some embodiments, the user at location 114 can be a different user when compared to the user of the device 102. For example, the device 102 can be considered to be a primary wireless device of a user and the location 112 can be considered to be home location of the user associated with the device 102. In this context, location 114 can be considered to be associated with a secondary wireless device. In other embodiments, the second version can also be sent to the device 102 as well as to the secondary wireless device at location 114.

Figure 2:
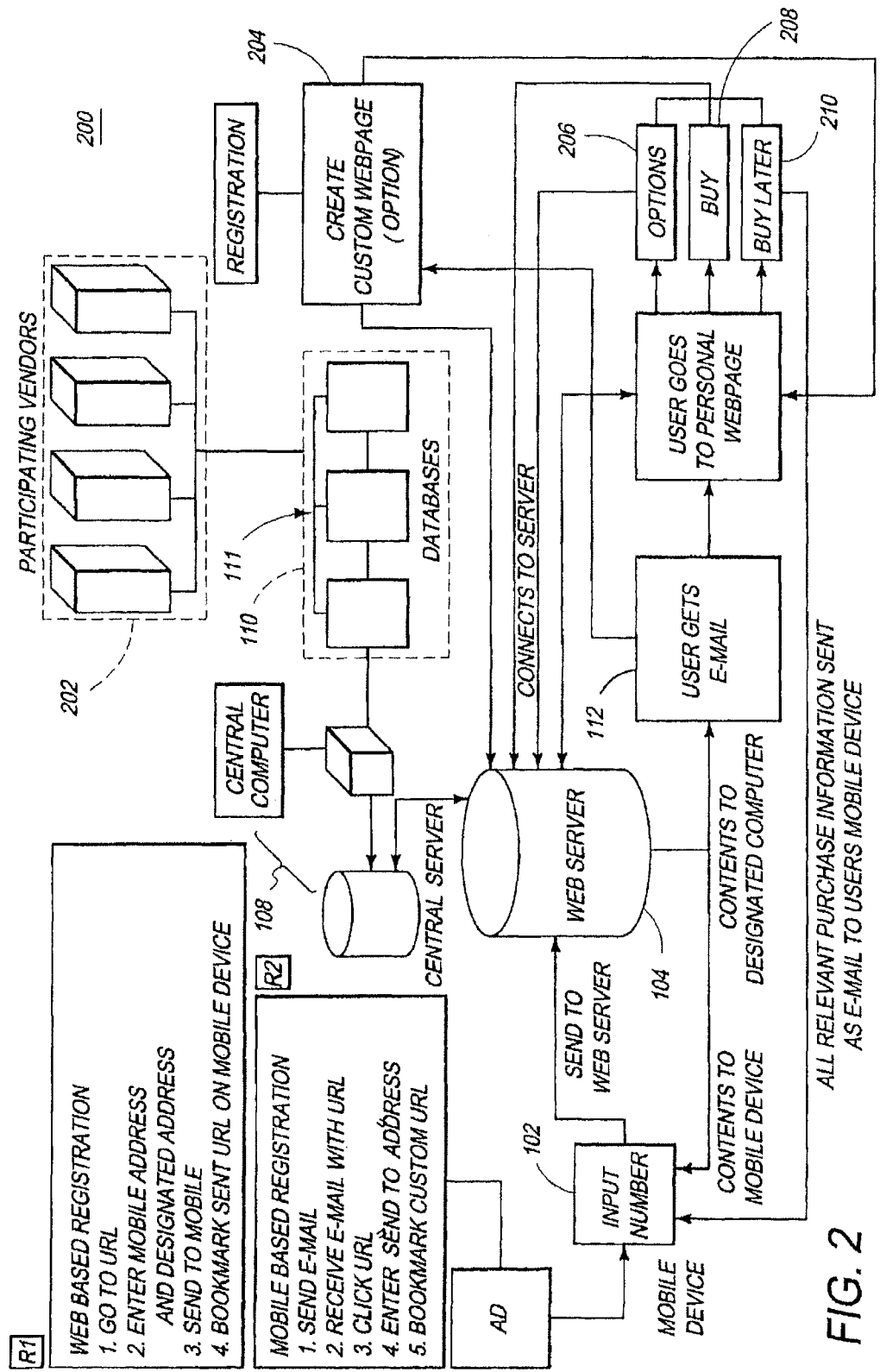
FIG. 2 is a detailed schematic of the system shown in FIG. 1 in accordance with various embodiments of the invention.

FIG. 2 is a detailed schematic of the system shown in FIG. 1 in accordance with various embodiments of the invention wherein elements like those shown in FIG. 1 are identified using similar reference numerals. Description of such like elements is therefore not repeated herein. System 200 includes a wireless communications device 102, a web server 104, a central server 108 comprising a computer (e.g., processing circuitry), a storage device 110 having one or more databases 111, location 112 (e.g., home location of user carrying device 102), a plurality of participating vendors 202. The user at location 112 can create a custom web page 204 and can register with the web server 104 using a unique user identifier (user-id) and a user-chosen password. The user at location 112 can visit the custom web page 204 and be presented with options 206. The options include at least "purchase now" 208 and "purchase later" 210 options.

Aspects of the invention provide each distributed media (e.g., advertisement campaign distributed via print, radio, television, or other communication media) that is a part of the system 200 with a unique alphanumeric code. For example, a specific advertisement campaign is assigned a unique code. In some embodiments, such codes can be alphanumeric codes or numeric codes. In some other embodiments, such unique code can be any code that can be used to represent a specific advertisement campaign. Such advertisement campaign can be a marketing campaign to promote a product or a service. A user (e.g., a user of the device 102) can register with the system 200 and access desired information content from the storage device 110 or the databases 111 by entering a unique alphanumeric code specific to such information content. The accessed information content can be self-distributed by the user to a user-desired location (e.g., location 112 having home e-mail address, location 114 associated with a wireless device).

Vendors 202 interested in participating in an advertisement campaign provide information for storage in the storage device 110 comprising one or more databases 111. The databases can be located in a single location or can be distributed across wide ranging locations. Such distributed databases can be communicatively linked so as to provide transparent access to a user for storing and retrieving information. Distinct information related to products and services stored in the storage device 110 or the databases 111 is assigned distinct alphanumeric codes or numeric codes. Accordingly, information related to a distinct product or service can be retrieved by using an alphanumeric code assigned to such product or service. It will be appreciated that the invention should not be limited to the alphanumeric codes or the numeric codes that are used to represent a distinct product or service. As such, any code or number or a combination can be used to represent a distinct product or service. Codes other than the numeric or the alphanumeric characters are possible.

A user of the system 200 can register using a web-based registration process or a mobile-based registration process in order to obtain further information regarding a product or service observed by the user. The product or service is promoted by one or more participating vendors 202 and additional information related to such product or the service can be stored in the storage device 110 or one or more databases 111. After registering with the system 200, the device 102 is provided with an interface having one or more fields for entering the alphanumeric code in order to retrieve further information related to the product or the service corresponding to the entered alphanumeric code. Such information can be obtained by accessing a web site having a specified IP address, and the universal resource locator (URL) of such web page can be stored in the device 102. Further details regarding the web-based registration and mobile-based registration are described below with respect to FIGS. 5-6.

After registering with the system 200, a user of the device 102 upon seeing a product or a service can enter the alphanumeric code displayed against such product or service into the device 102 to obtain additional information related to the product or the service. The alphanumeric code entered into the device 102 is routed to the web server 104 and then to the central server 108 for further processing. In the central server 108, the entered alphanumeric code is compared with information stored in the storage device 110. After determining a match, such information is extracted from the storage device 110 and further processed in the central server 108 in accordance with user-defined rules stored therein.

Figure 3:
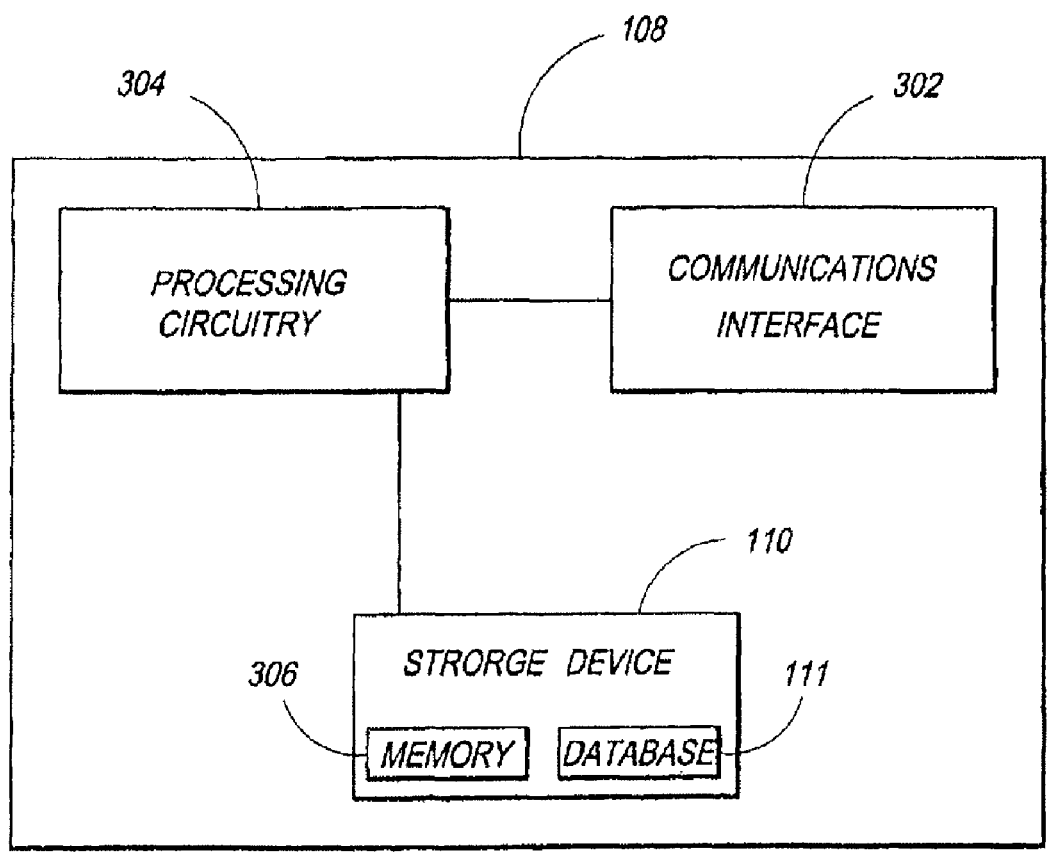
FIG. 3 is a detailed schematic of a central server shown in FIGS. 1 and 2 in accordance with various embodiments of the invention.

Such processed information is sent to the web server 104 which in turn can forward such processed information to a user-desired location (e.g., location 112 or location 114). In some embodiments, location 114 can be the same location of the device 102. In some embodiments, information forwarded to the home location (e.g., location 112) of the user can be a first version of the processed information. A second reduced version of the information can also be generated based on the user-defined rules that are stored in the central server 108 or processing circuitry 302 as shown in FIG. 3. The second reduced version can include a subset of information of the first version. For example, the second reduced version can be generated by filtering information content of the first version with user-defined filter characteristics. The first version of information content comprises dynamically generated web pages configured to be transmitted over the communications medium 106. The first and second versions of information content can comprise audio or video content.

The second version of the information can be sent to another wireless communications device (e.g., at location 114) or the device 102. In some embodiments, the second version of the information can be sent to another wireless device at location 114 as well as to the device 102. The second version of the information is routed to the device 102 for immediate use relative to the first version of the information that is sent to a user's home location for use at a later time. Depending on the memory capabilities of the device 102, the first version of the information (e.g., a copy of the information sent to the user's home location) can be routed to the device 102. The first and second versions of information can be sent to the user's home location and the device 102, respectively, as a hyperlink. The user upon activating (e.g., clicking) the hyperlink is directed to a dynamically created web page (e.g., standard web page, customized web page) having the processed information related to the alphanumeric code entered by the user. Web page content can be generated for each user as the inquiry is received so that each user is provided with a customized web page based on the user's input characteristics. A customized web page can also be created, in accordance with user preferences, with the processed information. The customized web page can be accessed by the user from a mobile device such as, for example, device 102 so that any stored information on the user customized web page can be accessed from the mobile device.

The customized web page if created by the user offers various options that include (i) saving an item in a wish list, (ii) sorting items stored on the web page by category, (iii) sending information related to a product or a service to others, (iv) checking on delivery of an ordered item, and (v) setting reminders for upcoming events such as, for example, birthdays, anniversaries, etc. The customized web page created by the user can be accessed from any network configured computer that can be used to connect to the communications medium 106. The user information is processed by the web server 104 and sent to the central server 108 for storage purposes.

Upon activating the hyperlink sent via an e-mail, the user is directed either to the customized web page if created by the user or to the standard web page. The user can view rich-media information on desired products/services on the web page. The user can store, retrieve, and sort the information shown on the web page. In addition, the user is presented with options 206 to purchase on-line the desired product(s) or services shown on the web page. The user is also presented with "purchase now" 208 or "purchase later" 210 options. In the event the user selects the "purchase later" 210 option, and if such option is selected from the user's home location, a copy of the information related to such "purchase later" option is sent to the user's wireless communications device (e.g., device 210) as a reminder to complete the transaction.

FIG. 3 is a detailed schematic of a central server 108 shown in FIGS. 1 and 2 in accordance with various embodiments of the invention. The central server 108 includes a communications interface 302, a processing circuitry 304, a storage device 110 having a database 111, and a memory 306. Although the storage device 110 and the database 111 are shown to be within the central server 108, such may also be provided outside of the central server 108 as shown in FIG. 1.

Communications interface 302 is configured to communicate electronic data externally of the central server 108. For example, the communications interface 302 enables communication with respect to the communications medium 106. In one embodiment, the communications interface 302 is arranged to provide input/output communications with respect to external devices (e.g., device 102, web server 104). Communications interface 302 may comprise a parallel port, USB port, EIO slot, network interface card, IEEE 1394 connector, and/or other appropriate configuration capable of communicating electronic data.

Processing circuitry 304 is configured to process data (e.g., information received from the web server 104) received as an input. As noted above, alphanumeric codes received by the web server 104 are forwarded to the server 108 for further processing via the communications medium 106 (FIG. 1).

The processing circuitry 304 may comprise circuitry configured to execute programming. In an exemplary embodiment, the processing circuitry 304 may be implemented as a microprocessor or other structure configured to execute executable applications of programming including, for example, software and/or firmware instructions. Other exemplary embodiments of processing circuitry 304 include hardware logic, PGA, FPGA, ASIC, and/or other structures. These examples of processing circuitry 304 are for illustration and other configurations are possible for implementing operations discussed herein.

In one example, processing circuitry 304 may be configured to include instructions or executable applications stored in the storage device 110 or the database 111 responsive to a user request. Exemplary commands or executable applications received by the central server 108 can include, for example, a user request to obtain additional information regarding a specific product or service. The processing circuitry 304 can also be used to create a customized web page for storing user preferences in the storage device 110, the customized web page being configured to be accessible from a network configured computer. The processing circuitry 304 is further configured to assign and process username and password information of a user registering with the system 100. The processing circuitry 304 is also configured to process information related to an address of the remote location where information content of the generated query result set is desired to be sent.

The storage device 110 may be configured to store information received from vendors 202 (FIG. 2), the information being related to a variety of products or services. The storage device 110 can comprise inventory of items or services. The device 102 can be used to determine the inventory of items stored in the storage device 110. The device 102 can be used to retrieve a select inventory item from the storage device 110 in order to determine the details of the selected inventory item. The storage device 110 may also be configured to store file systems having one or more electronic files, programming such as executable instructions (e.g., software and/or firmware), and/or other digital information and may include processor-usable media.

Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, and infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Figure 4:
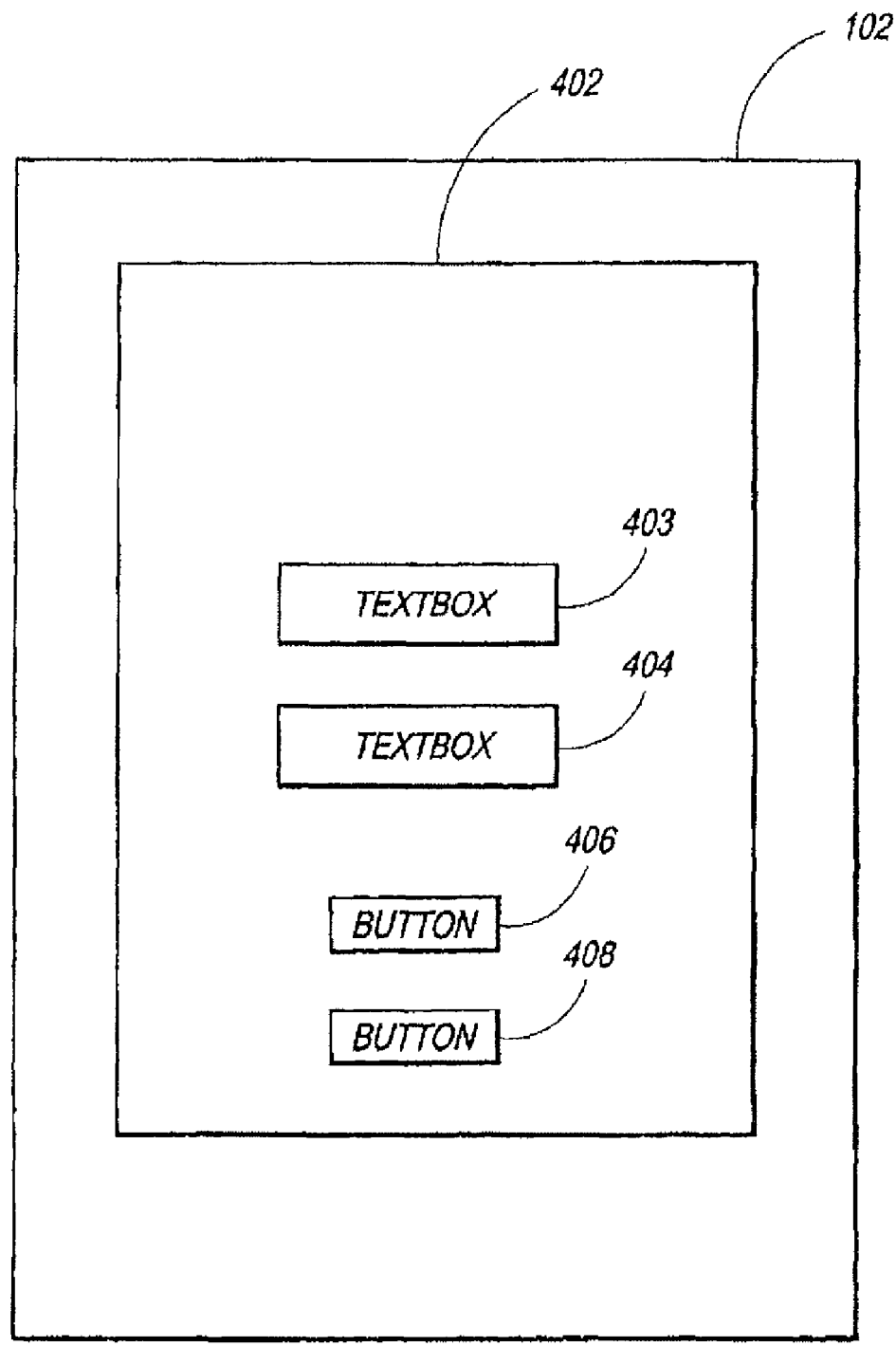
FIG. 4 is an exemplary portable communications device shown in FIGS. 1 and 2 in accordance with various embodiments of the invention.

FIG. 4 is a schematic of an exemplary portable communications device 102 shown in FIGS. 1 and 2 in accordance with various embodiments of the invention. The device 102 can be a cellular phone or a personal digital assistant with communications capabilities. Other wireless communications devices can be used. In accordance with the various embodiments, the device 102 is web-enabled and includes a user interface 402. The device 102 can also send and receive electronic messages. The user interface 402 includes a plurality of text boxes 403, 404 configured to receive information (e.g., alphanumeric codes or numeric codes) from the user. The user interface 402 can also include buttons 406, 408 that can be used by a user for performing various tasks such as, for example, book marking a web page, submitting the alphanumeric code entered in a text box to be sent to the web server 104, etc. The buttons and the text boxes shown on the user interface 402 are exemplary. More or less number of buttons or text boxes are possible.

In other embodiments, the system 100 can be used to perform inventory maintenance of items without a barcode scanner. For example, a pre-designated code for a select item can be entered in the user interface 402 and the storage device 110 (FIG. 1) can be searched for information related to the selected item. A hyperlink associated with a generated result set is sent to the user's home location and another hyperlink associated with a different reduced version of the result set is sent to the user's mobile communications device (e.g., device 102). Accordingly, a mobile user can obtain further details regarding a selected inventory item and also determine the inventory of the items and their usage.

In some other embodiments, the system 100 can be used in art galleries or museums in order to obtain additional information regarding a displayed object. For example, each of the displayed objects can be given a unique alphanumeric code. Such alphanumeric code can be entered into a user's mobile communications device in order to obtain details of a displayed object. Of course, in such other embodiments, the storage device 110 would be stored with information related to the displayed objects and the alphanumeric codes associated therewith. The central server 108 (e.g., processing circuitry 304 of the central server) can be used to compare the alphanumeric code, of a displayed object, entered by the user with the information stored in the storage device 110. Upon determining a match, the generated result set is forwarded to the user's home location (e.g., location 112) and another version of the result set is forwarded to the user's mobile communications device (e.g., device 102) as described above with respect to FIG. 1. Such information can also be used by a user to keep track of the displayed objects seen by the user at the art gallery or the museum.

In further other embodiments, various articles disclosed in newspapers or other such periodicals can be associated with distinct numeric or alphanumeric codes as described above. A user can then use the system as disclosed in FIG. 1 to reference the articles from a remote location having a connection to the interne. The user is thus provided with an ability to manage information that is of particular interest to the user.

Figure 5:
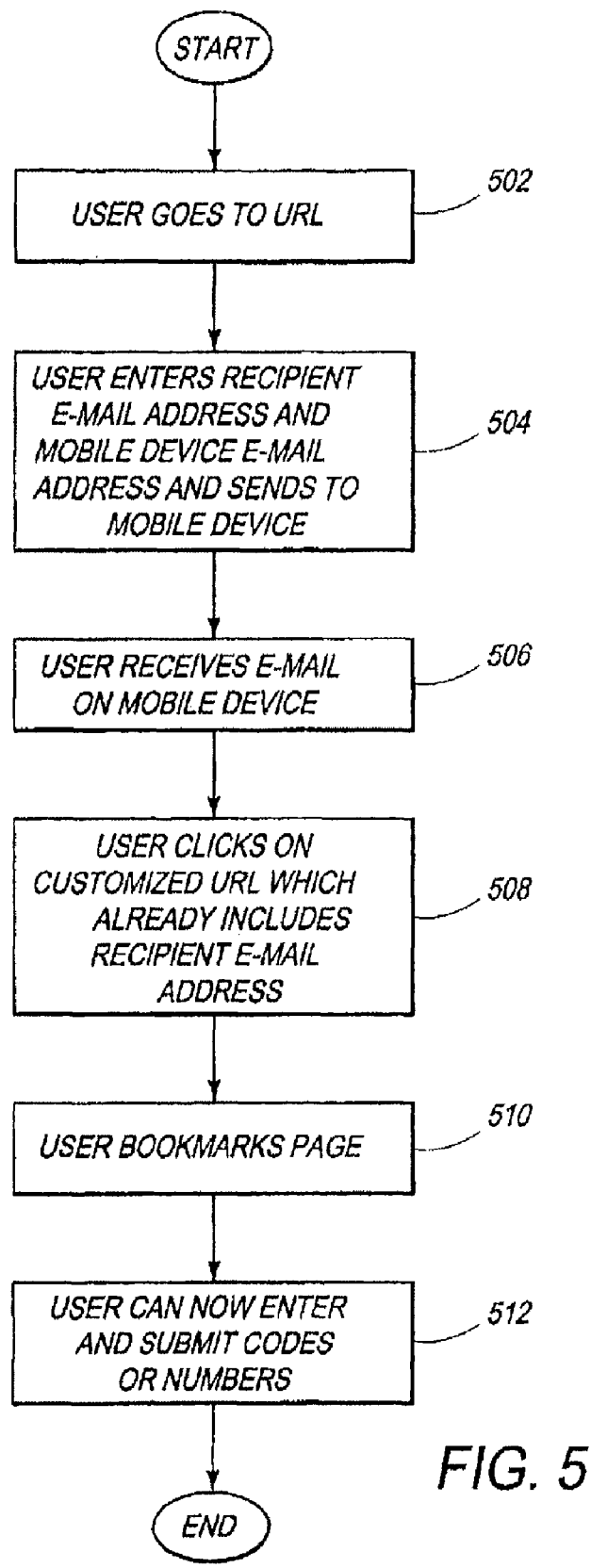
FIG. 5 is a flow chart illustrating the exemplary steps involved in a web-based registration process in accordance with some embodiments of the invention.

FIG. 5 is a flow chart illustrating the exemplary steps involved in a web-based registration process in accordance with some embodiments of the invention.

At a step 502, a user visits the URL corresponding to the alphanumeric code or the numeric code as seen by the user (e.g., in an advertisement campaign). The method then proceeds to step 504.

At a step 504, the user enters recipient e-mail address and mobile device (e.g., device 102) e-mail address and sends the message to the mobile device. The method then proceeds to step 506.

At a step 506, a user of the mobile device receives e-mail. The method then proceeds to step 508.

At a step 508, the user of the mobile device clicks on the URL which includes recipient e-mail address. The method then proceeds to step 510.

At a step 510, the user of the mobile device can bookmark the web page.

At a step 512, the user of the mobile device can enter and submit alphanumeric codes or numeric codes corresponding to a product or service or an advertisement campaign.

Figure 6:
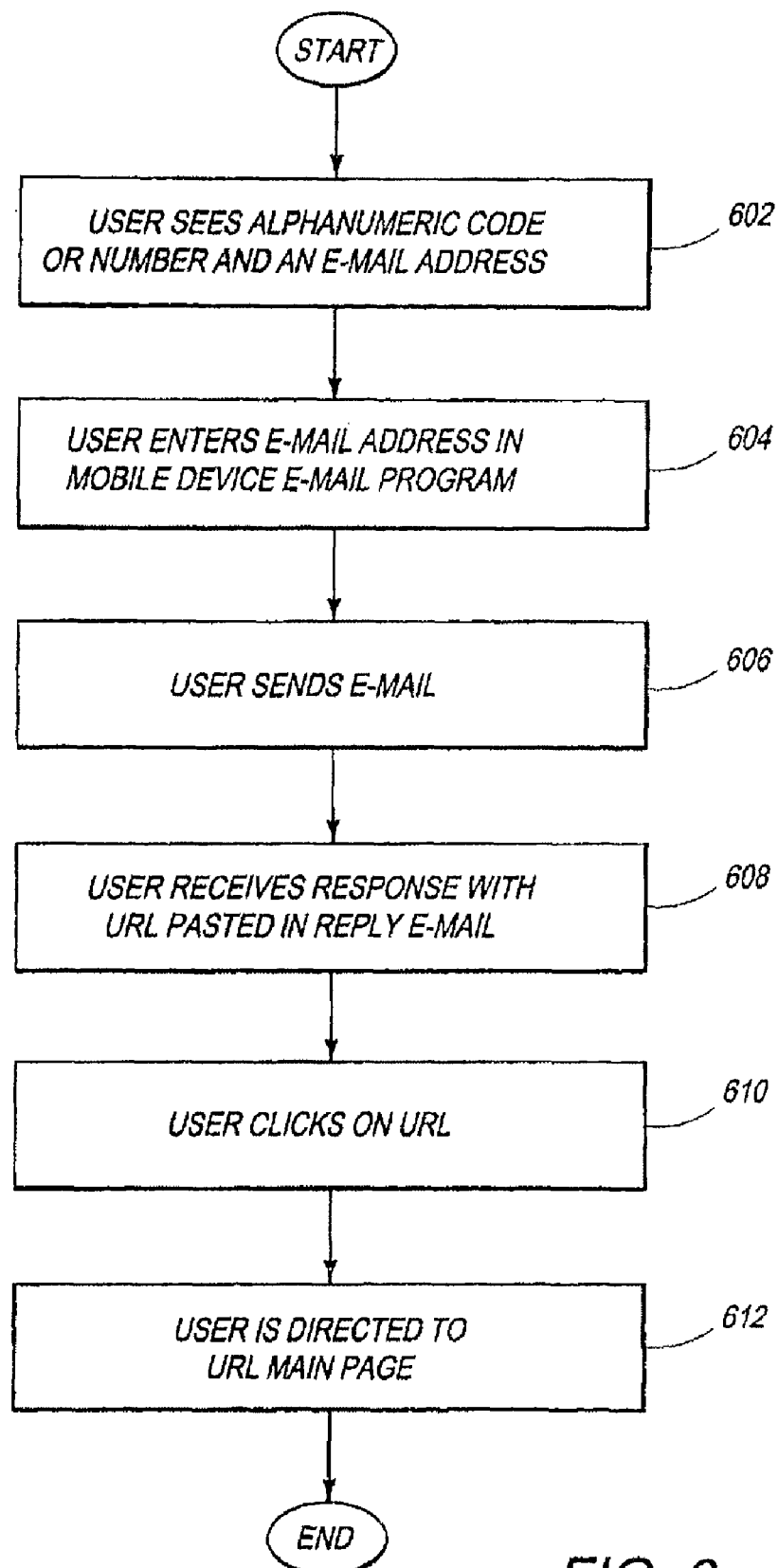
FIG. 6 is a flow chart illustrating the exemplary steps involved in a mobile registration process in accordance with some embodiments of the invention.

FIG. 6 is a flow chart illustrating the exemplary steps involved in a mobile registration process in accordance with some embodiments of the invention.

At a step 602, a user of the device 102 sees alphanumeric code or number (e.g., numeric code representing an advertising campaign, a product, or a service) and an e-mail address which will direct users to a registration web page.

At a step 604, the user enters the e-mail address in step 602, in the e-mail program of the device 102. The method then proceeds to step 606.

At a step 606, the user sends the e-mail. The method then proceeds to step 608.

At a step 608, the user receives an e-mail response with a URL pasted in the e-mail response. The method then proceeds to step 610.

At steps 610 and 612, the user activates (e.g., clicks) on the URL to be directed to the main web page of the URL. The user can then submit codes (e.g., numeric or alphanumeric codes, or other associated number or code) related to the advertisement campaign, product, or service to obtain additional information related to such advertisement campaign, product, or service. The user can also bookmark the web page.

Figure 7:
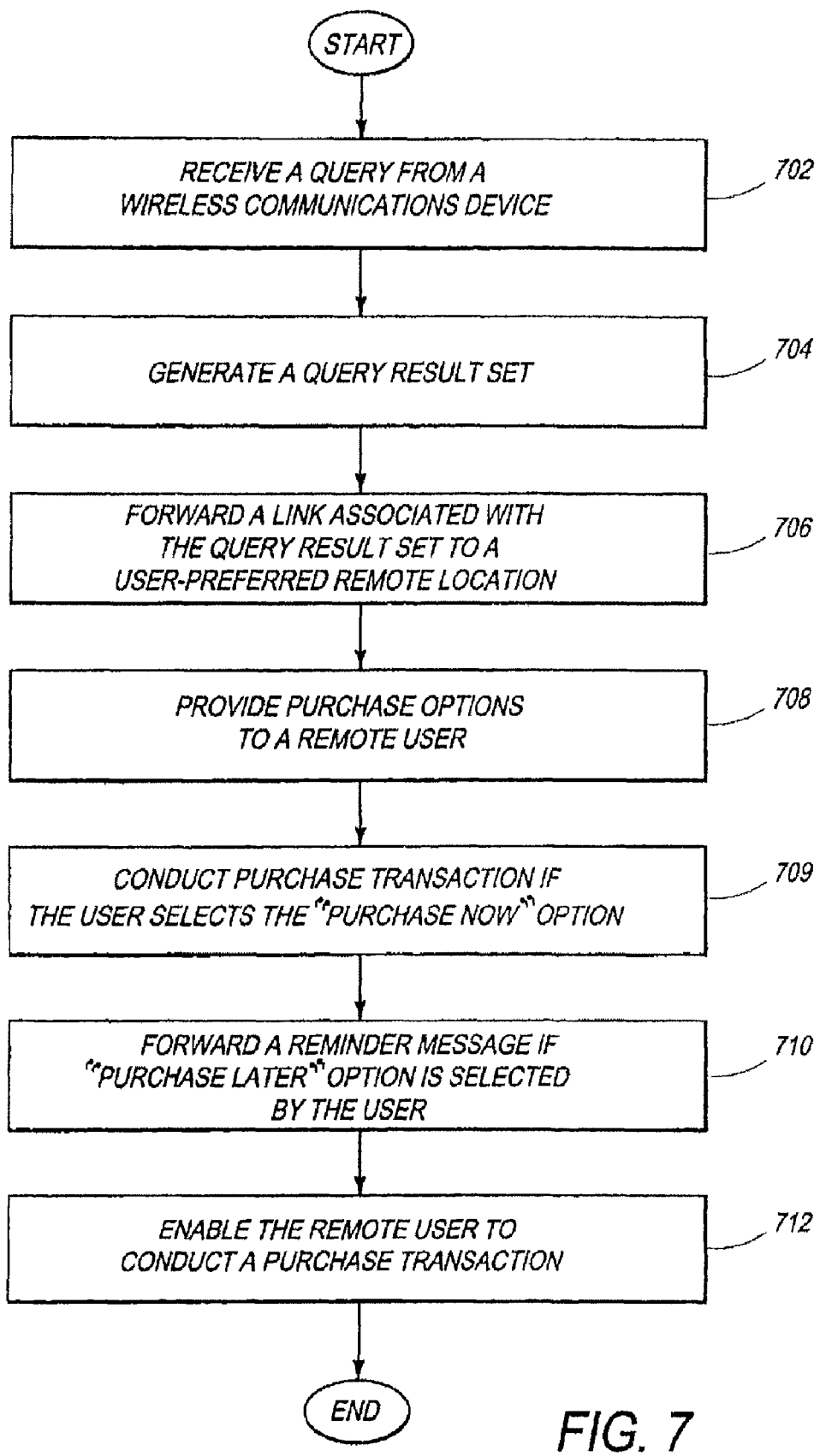
FIG. 7 is a flow chart illustrating the steps involved in enabling users to quickly choose desired information on content of distributed media at the point of original contact and to conduct a purchase transaction in accordance with various embodiments of the invention.

FIG. 7 is a flow chart illustrating the steps involved in enabling users to quickly obtain desired information on content of distributed media at the point of original contact and conduct a purchase transaction in accordance with various embodiments of the invention. The point of original contact is defined as a geographical location of a user where the user has first noticed an advertisement or some information related to a product or a service. For example, such information can include information distributed via print, radio, or television disseminated information. For example, information distributed via print can include information disclosed in newspapers.

At a step 702, a query is received, against the storage device 110 or the database 111, from a wireless communications device (e.g., device 102). The method then proceeds to step 704.

At a step 704, a query result set is generated. The query result set can be generated by the central server 108 and sent to the web server 104. The method then proceeds to step 706.

At a step 706, a hyperlink associated with the query result set is forwarded to a user-preferred remote location, the hyperlink directing the user to a first version of information content of the query result set. For example, a hyperlink associated with the first version of information content can be sent to a user's home location. The first version of information content can include detailed information corresponding to a product or a service as the user would not be subjected to constraints that are inherent relative to a mobile communications device. A second version of the information content of the query result set may be generated for immediate use by the user of the mobile device. The second version of the information content can be generated by the central server 108 in accordance with user defined rules stored in the processing circuitry 304 (FIG. 3). A hyperlink associated with the second version of the information content is sent to the mobile device (e.g., device 102) of the user.

As described above, the second version of the information content can be forwarded either to the mobile device (e.g., device 102) or to another wireless communications device (e.g., at location 114 (FIG. 1)), or both to the mobile device and the another wireless communications device. The method then proceeds to step 708.

At a step 708, the user is provided with purchase options. The purchase options can include "purchase now" or "purchase later" options. The method then proceeds to step 709.

At a step 709, purchase transaction is conducted if the user selects the "purchase now" option. The method then proceeds to step 710.

At a step 710, a reminder message is forwarded to the user at the user's mobile device if the "purchase later" option is selected by the user. The method then proceeds to step 712.

At a step 712, the user of the mobile device is enabled to conduct the purchase transaction.

Aspects of the invention provide various advantages, which in some embodiments include facilitating users to be able to quickly chose relevant information on content of distributed media at a point of reference and have that information sent to a receiving location (e.g., home e-mail address) where the user-experience is not limited by screen space, functionality and other environmental factors. Advantages of the various aspects of the invention also include enabling organizations using the system of the present invention to assess the quality of their communication programs (e.g., advertisement campaigns) by determining which groups of users are responding to the content by inquiring about additional information of the communication programs. Accordingly, organizations using aspects of the present invention would be able to directly determine as to how successful their communication programs (e.g., advertisement campaigns) are by determining which content is being accessed, and by whom and from which geographical location. The self-distribution method and system as disclosed in various aspects can be used to overcome problems related to direct mail and spam by enabling the user to control generation and receipt of e-mail messages desired by the user.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for distributing data comprising:
   receiving, by at least one computer, a code from a wireless communication device;
   sending, by the at least one computer, based on the code, a first version of the data to the wireless communication device; and
   sending to a second device, based on the code, a link to a second version of the data.

2. The method of claim 1, wherein the link to the second version of the data is sent to the second device via an e-mail program of the wireless communication device.

3. The method of claim 1, wherein the code includes at least one of a numeric code and an alphanumeric code.

4. The method of claim 1, wherein the code was acquired by the wireless communication device from an external display or printed media.

5. The method of claim 1, wherein the code is related to vendor information.

6. The method of claim 1, further comprising:
   modifying the first version of the data based on user identification information received from the wireless communication device.

7. The method of claim 1, further comprising:
   formatting the first version of the data for immediate use on the wireless communication device; and
   formatting the second version of the data for use on the second device.

8. A method for distributing data comprising:
   receiving, by at least one computer, a code from a wireless communication device;
   sending, by the at least one computer, based on the code, a first version of the data to the wireless communication device; and
   initiating, based on the code, a transmission to a second device, of a link to a second version of the data.

9. The method of claim 8, wherein the transmission of the link to a second device comprises sending an e-mail message using an e-mail application of the wireless communication device.

10. The method of claim 8, wherein the code includes at least one of a numeric code and an alphanumeric code.

11. The method of claim 8, wherein the code was acquired by the wireless communication device from an external display or printed media.

12. The method of claim 8, wherein the code is related to vendor information.

13. The method of claim 8, further comprising:
    modifying the first version of the data based on user identification information received from the wireless communication device.

14. The method of claim 8, further comprising:
    formatting the first version of the data for immediate use on the wireless communication device; and
formatting the second version of the data for use on a second device.

15. A method for distributing data comprising:
    sending, by a wireless communication device, a code to a server;
    receiving from the server, by the wireless communication device, a first version of the data associated with the code; and
    sending to a second device, based on the code, a link to a second version of the data.

16. The method of claim 15, wherein the link to the second version of the data is sent using an e-mail program of the wireless communication device.

17. The method of claim 15, wherein the code includes at least one of a numeric code and an alphanumeric code.

18. The method of claim 15, wherein the code was acquired by the wireless communication device from an external display or printed media.

19. The method of claim 15, wherein the code is related to vendor information.

20. The method of claim 15 further comprising:
    formatting the first version of the data for immediate use on the wireless communication device; and
    formatting the second version of the data for use on the second device.

* * * * *